United States Patent
Lin et al.

(10) Patent No.: US 10,581,319 B1
(45) Date of Patent: Mar. 3, 2020

(54) RESONANT CONVERTER WITH MAGNETIC-FLUX BALANCE CONTROL CIRCUIT

(71) Applicant: National Taiwan University, Taipei (TW)

(72) Inventors: Yuan-Chih Lin, Taipei (TW); Ching-Jan Chen, Taipei (TW)

(73) Assignee: NATIONAL TAIWAN UNIVERSITY, Taipei (TW)

(*) Notice: Subject to any disclaimer, the term of this patent is extended or adjusted under 35 U.S.C. 154(b) by 0 days.

(21) Appl. No.: 16/520,405

(22) Filed: Jul. 24, 2019

(30) Foreign Application Priority Data

Mar. 15, 2019 (TW) .............................. 108108914 A

(51) Int. Cl.
| | |
|---|---|
| *H02M 1/40* | (2007.01) |
| *H02M 1/088* | (2006.01) |
| *H02M 3/335* | (2006.01) |
| *H02M 1/00* | (2006.01) |
| *H02M 7/48* | (2007.01) |

(52) U.S. Cl.
CPC ............. *H02M 1/40* (2013.01); *H02M 1/088* (2013.01); *H02M 3/33569* (2013.01); *H02M 2001/0009* (2013.01); *H02M 2007/4811* (2013.01); *H02M 2007/4815* (2013.01)

(58) Field of Classification Search
CPC .. H02M 2007/4815; H02M 2007/4811; H02M 3/33569
USPC ............................... 363/21.02, 21.03, 78, 79
See application file for complete search history.

(56) References Cited

U.S. PATENT DOCUMENTS

| | | | | |
|---|---|---|---|---|
| 7,915,757 B2* | 3/2011 | Kim | .................. | H02M 3/33561 307/31 |
| 8,107,262 B2* | 1/2012 | Won | ..................... | H02M 3/3376 363/132 |
| 2009/0213623 A1* | 8/2009 | Yang | ................. | H02M 3/33507 363/49 |
| 2012/0262954 A1* | 10/2012 | Duvnjak | ............. | H02M 1/4258 363/21.02 |
| 2014/0098574 A1* | 4/2014 | Hara | ................. | H02M 3/33592 363/21.02 |
| 2014/0313790 A1* | 10/2014 | Feng | ....................... | H02M 1/36 363/21.02 |

* cited by examiner

*Primary Examiner* — Gary A Nash
(74) *Attorney, Agent, or Firm* — Bacon & Thomas, PLLC

(57) ABSTRACT

The present invention provides a LLC resonant converter with magnetic-flux balance control circuit. The LLC resonant converter comprises a primary-side circuit and a secondary-side circuit, wherein the control loop of secondary-side circuit comprises a voltage control unit, a digital pulse-width-modulation generation unit, and the control loop of primary-side circuit comprises a DC detection unit, a balance control unit, a digital pulse-width-modulation generation unit.

10 Claims, 14 Drawing Sheets

RESONANT CONVERTER WITH MAGNETIC-FLUX BALANCE CONTROL CIRCUIT

BACKGROUND OF THE INVENTION

1. Field of the Invention

The present invention provides a LLC resonant converter with magnetic-flux control circuit, and the magnetic-flux estimation method, particularly to the present invention can adjust the switch-conducting duty-cycle ratio through detecting the magnetic-flux DC level, and further can improve the magnetic-flux balance effect.

2. Description of the Prior Art

The conventional LLC resonant converter is widely used in the power system of various computer equipment. Because there has zero voltage/zero current switching, it is easy to achieve high efficiency operation. However, the conventional LLC resonant converter includes a high-frequency isolation transformer, which is similar to the conventional isolation-type pulse-width-modulation (PWM) converter. Due to the non-ideality property of circuit, the magnetic-flux unbalance will be generated to cause the magnetic-flux saturation problem of transformer.

Therefore, there are two reasons to cause the magnetic-flux unbalance of the abovementioned conventional resonant converter, which are described as the followings:

The first main reason: The switching element characteristics of upper and lower arm for primary-side bridge switch of transformer with the driven signal are inconsistent. The switch is required for the primary-side to do high-frequency switching, in order to convert the DC voltage to the high-frequency square wave voltage. However, the characteristics of each switch and the performance of driven circuit may not be all the same in the hardware performance, so that the positive half cycle and the negative half cycle of generated high-frequency square wave voltage will not be totally symmetrical, and then cause the magnetic-flux unbalance phenomenon.

The second main reason: The leakage inductor of two windings for the secondary-side of transformer, the winding resistor, the trace of printed circuit board (PCB), and the characteristics of rectifier elements are inconsistent.

As shown in FIG. 1, the circuit diagram of half-bridge LLC resonant converter is illustrated. The transformer is made by center-tapped. There are two sets of windings for secondary-side. The leakage inductor of two windings, the winding resistor, the resistor on the trace of PCB, and the characteristics of rectifier elements are inconsistent, so that the unbalanced magnetizing current is occurred at the primary-side, resulting in the generation of magnetic flux shift phenomenon.

As shown in FIG. 2A, FIG. 2B, and FIG. 2C, the push pull converter, the half-bridge converter, and the full-bridge converter of isolation-type pulse-width-modulation converter are illustrated, respectively. All of them can generate the magnetic-flux unbalance phenomenon.

Still as shown in the abovementioned FIG. 2A, FIG. 2B, and FIG. 2C, the general isolation-type pulse-width-modulation converters are illustrated. All include the high-frequency isolation transformer. Thus, all will also face the magnetic-flux unbalance problem to cause the transformer magnetic-flux saturation. However, differentiating with the abovementioned general isolation-type pulse-width-modulation converter, the conventional LLC resonant converter has a serial capacitor at the transformer input end due to the requirement of circuit operation characteristics. Therefore, the magnetic-flux unbalance phenomenon generated from the unbalance operation of primary-side circuit can be isolated, in order to prevent the generation of transformer saturation.

However, in the conventional LLC resonant converter, the abovementioned serial capacitor is unable to handle the magnetic-flux unbalance phenomenon generated by the asymmetrical operation of transformer secondary-side circuit, and cause the generation of transformer saturation problem.

In the conventional LLC resonant converter, the input end of transformer primary-side has a serial capacitor. The serial capacitor can eliminate the DC part of the primary-side current. Thus, the asymmetrical phenomenon generated from the primary-side circuit will not reflect on the primary-side current, which is different from the isolation-type pulse-width-modulation converter. Therefore, the solution for preventing the magnetic-flux shift adopted by general conventional isolation-type pulse-width-modulation converter is not suitable for the conventional LLC resonant converter.

With regard to the conventional LLC resonant converter, the transformer input end has a paralleled inductor. This paralleled inductor is the magnetizing inductor of transformer itself. The magnetizing inductor is an essential circuit element for the operation of conventional LLC resonant converter. Comparing to the isolation-type pulse-width-modulation converter, it is only used for the transformer magnetization.

In the conventional LLC resonant converter, the magnetizing inductor has a larger current. Thus, when the secondary-side current is asymmetrical, it has very big influence for the magnetizing current. This phenomenon is different from the isolation-type pulse-width-modulation converter. When the secondary-side asymmetry causes the shift of transformer magnetizing current, it will cause the generation of magnetic-flux saturation phenomenon, and cause the inconsistent loss of elements on secondary-side output loop. Meantime, it will cause the increase of output voltage ripple, and increase the output capacitor loss.

In the conventional isolation-type pulse-width-modulation converter, one of the common methods for improving the balance of magnetic-flux is to connect a serial capacitor at the primary-side, to isolate the primary-side unbalance. Regard with the LLC resonant converter, because it has the serial capacitor, it also can improve the primary-side unbalance, but it still cannot avoid the unbalance caused from the secondary-side.

With regard to the conventional isolation-type pulse-width-modulation converter, the other method for improving the balance of magnetic-flux is to detect the switch current at input end, to control the current peak value. Making current balance through by controlling the peak value during the positive half cycle and negative half cycle of current. But in the LLC resonant converter, it will not be suitable. Because the transformer input end of LLC resonant converter has a serial capacitor, the primary-side current will always be symmetrical, there is unable to observe the asymmetrical situation of secondary-side and magnetizing current from the primary-side.

To the current sensing part, because the magnetizing inductor of conventional LLC resonant converter is involved in the transformer, so that it cannot be sensed directly. The current relevant literatures can only measure the current value of magnetizing inductor indirectly. Because that method needs two sensors, the circuit cost is much more expensive. In order to solve the problem, a magnetizing inductor current detection method which is more cost saving needs to be developed.

SUMMARY OF THE INVENTION

In order to solve the abovementioned problem, the present invention discloses a LLC resonant converter with magnetic-flux control circuit, which can be used in the LLC resonant converter for controlling and estimating the transformer magnetic-flux balance, to prevent the transformer magnetic-flux unbalance caused by non-ideality characteristics of transformer secondary-side circuit in the LLC resonant converter, and further prevent the generation of transformer saturation.

The mechanism provided by the present invention can be widely applied to different power converter applications such as the power system of the server, the data center, the data storage system, and the consumer electronics, etc.

According to the embodiment of the present invention, a LLC resonant converter with magnetic-flux control circuit is provided, comprising: a LLC resonant converter, which includes a primary-side circuit and a secondary-side circuit, wherein the primary-side circuit includes a primary-side winding, a resonant inductor, a resonant capacitor, a first switch and a second switch, the secondary-side circuit includes a secondary-side winding, a first diode, a second diode, an output capacitor and an output resistor, the secondary-side winding includes a first secondary-side winding and a second secondary-side winding; a voltage control unit, which is connecting to the secondary-side circuit, the voltage control unit, which is receiving the output voltage, and outputting a control voltage; a digital pulse-width-modulation generation unit, which is connecting to the voltage control unit, the voltage control unit sends the control voltage to the digital pulse-width-modulation generation unit for adjusting and controlling the switching period of the first switch and the second switch; a DC detection unit, which is connecting the primary-side circuit, the DC detection unit detects the sensed resonant inductor current signal of the primary-side circuit in accordance with the pulse signal generated by the digital pulse-width-modulation generation unit, and calculates the magnetizing inductor average current of a transformer in accordance with the sensed resonant inductor current signal; a balance control unit, which is connecting to the DC detection unit, wherein, the balance control unit achieves to adjust the transformer magnetizing inductor average current to zero ampere, through adjusting the first switch duty-cycle ratio of the first switch and the second switch duty-cycle ratio of the second switch.

In an embodiment of the present invention, the LLC resonant converter includes a DC power source, a first switch, a second switch, a resonant inductor, a resonant capacitor, a magnetizing inductor, a first diode, a second diode, an output capacitor, an output resistor and an ideal center-tapped transformer. The first switch, the second switch, the resonant inductor, the resonant capacitor, the magnetizing inductor, and the output resistor have a first end and a second end, respectively; the DC power source, the first diode, the second diode, and the output capacitor have a positive end and a negative end, respectively. The secondary-side winding includes a first secondary-side winding and a second secondary-side winding; the primary-side winding, the first secondary-side winding and the second secondary-side winding have a positive end and a negative end, respectively. The positive end of the DC power source connects to the first end of the first switch, and the negative end of the DC power source connects to the second end of the second switch. The second end of the first switch and the first end of the second switch, and the first end of the resonant capacitor are all connected together. The second end of the resonant capacitor connects to the first end of the resonant inductor. The second end of the resonant inductor connects to the first end of the magnetizing inductor and the positive end of the primary-side winding. The second end of the magnetizing inductor and the negative end of the primary-side winding, and the second end of the second switch are all connected together. The positive end of the first secondary-side winding and the negative end of the second secondary-side winding, the positive end of the output capacitor, and the first end of the output resistor are all connected together. The negative end of the first secondary-side winding connects to the negative end of the first diode. The positive end of the second secondary-side winding connects to the negative end of the second diode. The positive end of the first diode and the positive end of the second diode, the negative end of the output capacitor, and the second end of the output resistor are all connected together.

In an embodiment of the present invention, the voltage control unit and balance control unit have an input end and an output end, respectively. The digital pulse-width-modulation generation unit has a first input end, second input end, first output end, second output end, third output end, and fourth output end. The DC detection unit has a first input end, second input end, third input ends and one output end. The first input end of digital pulse-width-modulation generation unit connects to the output end of the voltage control unit. The input end of the voltage control unit connects to the positive end of the output capacitor in the secondary-side circuit of the LLC resonant converter. The second input end of the digital pulse-width-modulation generation unit connects to the output end of the balance control unit. The input end of the balance control unit connects to the output end of the DC detection unit. The first output end and second output end of the digital pulse-width-modulation generation unit are the driven signal of the first switch and the second switch, respectively. The third output end of the digital pulse-width-modulation generation unit is the first pulse signal, which is also the second input end of the DC detection unit. The fourth output end of the digital pulse-width-modulation generation unit is the second pulse signal, which is also the third input end of the DC detection unit. The first input end of the DC detection unit is the signal of the sensed resonant inductor current.

In an embodiment of the present invention, the sum of the first switch duty-cycle ratio and the second switch duty-cycle ratio is 100%.

Under the balance condition of the LLC resonant converter circuit, wherein the first switch duty-cycle ratio is 50%, and the second switch duty-cycle ratio is also 50%.

In an embodiment of the present invention, when the LLC resonant converter lies at the region 1 of voltage gain, and when the first switch is conducted, the digital pulse-width-modulation generation unit sends out a first pulse signal without the delay time, in order to obtain a minimum value of the magnetizing inductor current. When the second switch is conducted, the digital pulse-width-modulation generation unit sends out a second pulse signal without the delay time, in order to obtain a maximum value of the magnetizing inductor current.

In an embodiment of the present invention, when the LLC resonant converter lies at region 2 of the voltage gain, and when the first switch is conducted, the digital pulse-width-modulation generation unit sends out a first pulse signal with the delay time, in order to obtain a minimum value of the magnetizing inductor current. When the second switch is conducted, the digital pulse-width-modulation generation unit sends out a second pulse signal with the delay time, in order to obtain a maximum value of the magnetizing inductor current.

In an embodiment of the present invention, wherein the DC detection unit adds the minimum value of the magnetizing inductor current and the maximum value of the magnetizing inductor current to obtain the average current value, and after adjusted by the balance control unit, the average current value is zero ampere.

In an embodiment of the present invention, when LLC resonant converter lies at the region 1 of the voltage gain, the digital pulse-width-modulation generation unit sends out a first pulse signal without the delay time, and a second pulse signal without the delay time.

In an embodiment of the present invention, when LLC resonant converter lies at region 2 of the voltage gain, the digital pulse-width-modulation generation unit sends out a first pulse signal with the delay time, and a second pulse signal with the delay time.

Except applied to the structure of the half-bridge LLC resonant converter, the present invention can also be applied to the full-bridge LLC resonant converter, and the half-bridge LLC resonant converter with the split capacitor at the input end, and further more can be applied to the LLC resonant converters with other different structures.

In order to let the abovementioned characteristics and advantages of the present invention can be understood much more obviously, the following embodiments and the Figures are attached for detailed description as follows.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 3:
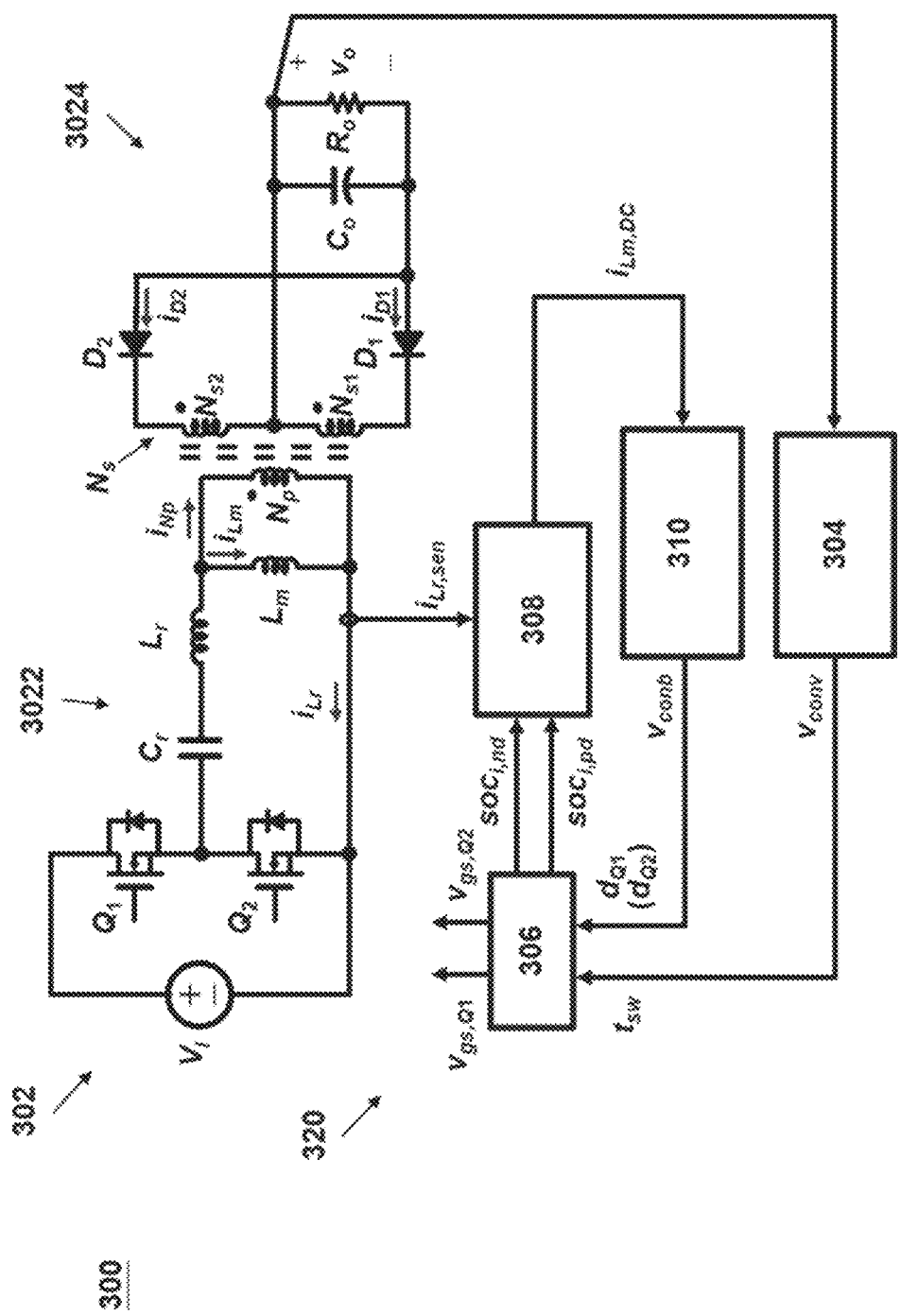
FIG. 3 illustrates a schematic diagram of the LLC resonant converter with magnetic-flux control circuit for an embodiment of the present invention.

Please refer to FIG. 3, FIG. 3 illustrates a schematic diagram of the LLC resonant converter with magnetic-flux control circuit for an embodiment of the present invention.

Please refer to FIG. 3 again, which illustrates the LLC resonant converter with magnetic-flux control circuit 300, including a LLC resonant converter 302, and a control unit 320. The LLC resonant converter 302 includes a primary-side circuit 3022 and a secondary-side circuit 3024, wherein the primary-side circuit 3022 includes a primary-side winding $N_p$, a resonant capacitor $C_r$, a resonant inductor $L_r$, a magnetizing inductor $L_m$, a first switch $Q_1$, a second switch $Q_2$, and a DC power source $V_i$. The secondary-side circuit 3024 includes a secondary-side winding $N_s$, a first diode $D_1$, a second diode $D_2$, an output capacitor $C_o$, and an output resistor $R_o$. The secondary-side winding $N_s$ includes a first secondary-side winding $N_{s1}$ and a second secondary-side winding $N_{s2}$. The control unit 320 includes a voltage control unit 304, a digital pulse-width-modulation generation unit 306, a DC detection unit 308, and a balance control unit 310.

Refer to the schematic diagram of the LLC resonant converter with magnetic-flux control circuit for an embodiment of the present invention illustrated in FIG. 3, in the primary-side circuit 3022 of the LLC resonant converter 302, the first switch $Q_1$, the second switch $Q_2$, the resonant inductor $L_r$, the resonant capacitor $C_r$, and the magnetizing inductor Lm have a first end and a second end, respectively, the primary-side winding $N_p$ and the DC power source $V_i$ have a positive end and a negative end, respectively. The positive end of the DC power source $V_i$ connects to the first end of the first switch $Q_1$. The negative end of the DC power source $V_i$ connects to the second end of the second switch $Q_2$. The second end of the first switch $Q_1$ and the first end of the second switch $Q_2$, and the first end of the resonant capacitor $C_r$ are all connected together. The second end of the resonant capacitor $C_r$ connects to the first end of the resonant inductor $L_r$. The second end of the resonant inductor $L_r$ connects to the first end of the magnetizing inductor $L_m$ and the positive end of the primary-side winding $N_p$. The second end of the magnetizing inductor $L_m$ and the negative end of the primary-side winding $N_p$ and the second end of the second switch $Q_2$ are all connected together.

Refer to the schematic diagram of the LLC resonant converter with magnetic-flux control circuit for an embodiment of the present invention illustrated in FIG. 3, in the secondary-side circuit 3024 of the LLC resonant converter 302, the output resistor $R_o$ has a first end and a second end. The first secondary-side winding $N_{s1}$, the second secondary-side winding $N_{s2}$, the first diode $D_1$, the second diode $D_2$, and the output capacitor $C_o$ have a positive end and a negative end, respectively. The positive end of the transformer first secondary-side winding $N_{s1}$ and the negative end of the second secondary-side winding $N_{s2}$, the positive end of the output capacitor $C_o$, and the first end of the output resistor $R_o$ are all connected together. The negative end of the transformer first secondary-side winding $N_{s1}$ connects to the negative end of the first diode $D_1$. The positive end of the transformer second secondary-side winding $N_{s2}$ connects to the negative end of the second diode $D_2$, the positive end of the first diode $D_1$ and the positive end of the second diode $D_2$, the negative end of the output capacitor $C_o$, and the second end of the output resistor $R_o$ are all connected together.

Refer to the schematic diagram of the LLC resonant converter with magnetic-flux control circuit for an embodiment of the present invention illustrated in FIG. 3 continuously, in the control unit 320, the voltage control unit 304 and the balance control unit 310 have an input end and an output end, respectively. The DC detection unit 308 has a first input end, a second input end, a third input ends and one output end. The digital pulse-width-modulation generation unit 306 has a first input end, a second input end, a first output end, a second output end, a third output end, and a fourth output end. The first input end $t_{sw}$ of the digital pulse-width-modulation generation unit 306 connects to the output end $V_{conv}$ of the voltage control unit 304. The input end of the voltage control unit 304 connects to the positive end of the output capacitor $C_o$ in the secondary-side circuit 3024 of the LLC resonant converter 302. The second input end $d_{Q1}(d_{Q2})$ of the digital pulse-width-modulation generation unit 306 connects to the output end $V_{conb}$ of the balance control unit 310. The first output end $V_{gs,Q1}$ and the second output end $V_{gs,Q2}$ of the digital pulse-width-modulation generation unit 306 are the driven signal of the first switch $Q_1$ and the second switch $Q_2$, respectively. The third output end $SOC_{i,nd}$ of the digital pulse-width-modulation generation unit 306 is the first pulse signal. The fourth output end $SOC_{i,pd}$ of the digital pulse-width-modulation generation unit 306 is the second pulse signal. The input end of the balance control unit 310 connects to the output end $i_{Lm,DC}$ of the DC detection unit 308. The first input end $i_{Lr,sen}$ of the DC detection unit 308 is the signal of the sensed resonant inductor current $i_{Lr}$. The second input end $SOC_{i,nd}$ of the DC detection unit 308 connects to the third output end of the digital pulse-width-modulation generation unit 306. The third input end $SOC_{i,pd}$ of the DC detection unit 308 connects to the fourth output end of the digital pulse-width-modulation generation unit 306.

As shown in FIG. 3, the DC detection unit 308 calculates an average magnetizing current value $i_{Lm,DC}$ through the sensed resonant inductor current signal $i_{Lr,sen}$ according to the first pulse signal $SOC_{i,nd}$ and the second pulse signal $SOC_{i,pd}$, and adjusted by the balance control unit 310, in order to achieve zero ampere of the DC magnetizing current. The balance control unit 310 achieves to adjust the average magnetizing current value $i_{Lm,DC}$ to zero ampere, through controlling the first switch duty-cycle ratio $d_{Q1}$ of the first switch $Q_1$ and the second switch duty-cycle ratio $d_{Q2}$ of the second switch $Q_2$. The LLC resonant converter 302 is a half-bridge LLC resonant converter. The sum of the first switch duty-cycle ratio $d_{Q1}$ and the second switch duty-cycle ratio $d_{Q2}$ is 100%.

Figure 4:
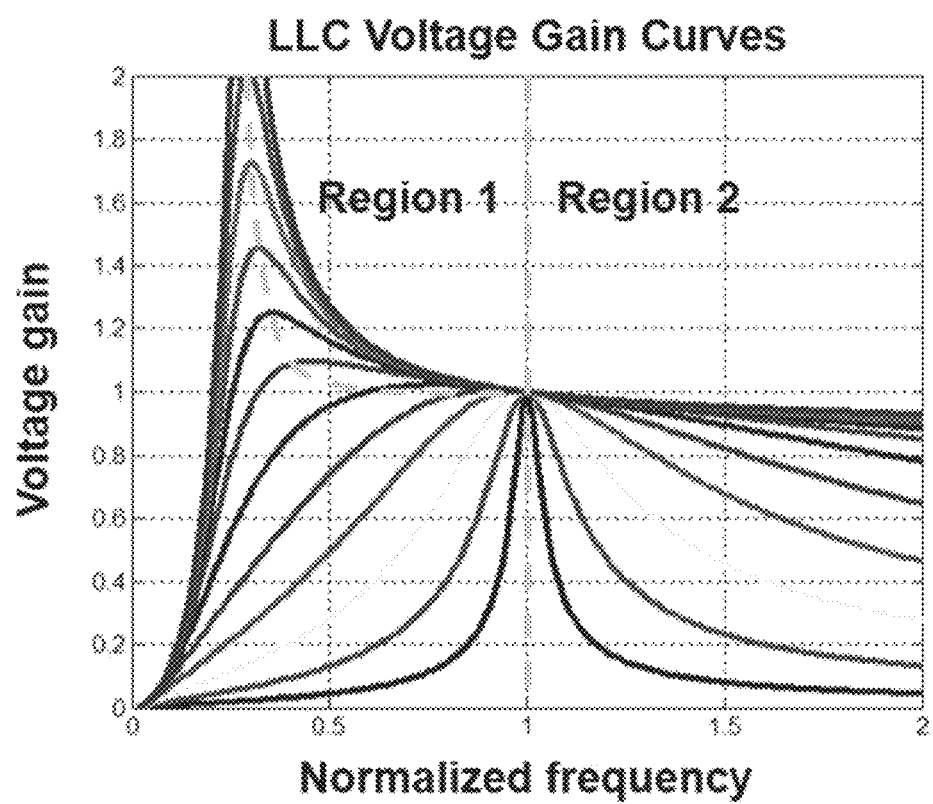
FIG. 4 illustrates an input/output voltage gain characteristic diagram of the LLC resonant converter for an embodiment of the present invention.

As shown in FIG. 4, the input/output voltage gain characteristic diagram of the LLC resonant converter for an embodiment of the present invention is illustrated. The output voltage gain characteristic diagram includes a region 1 and a region 2.

Figure 5A:
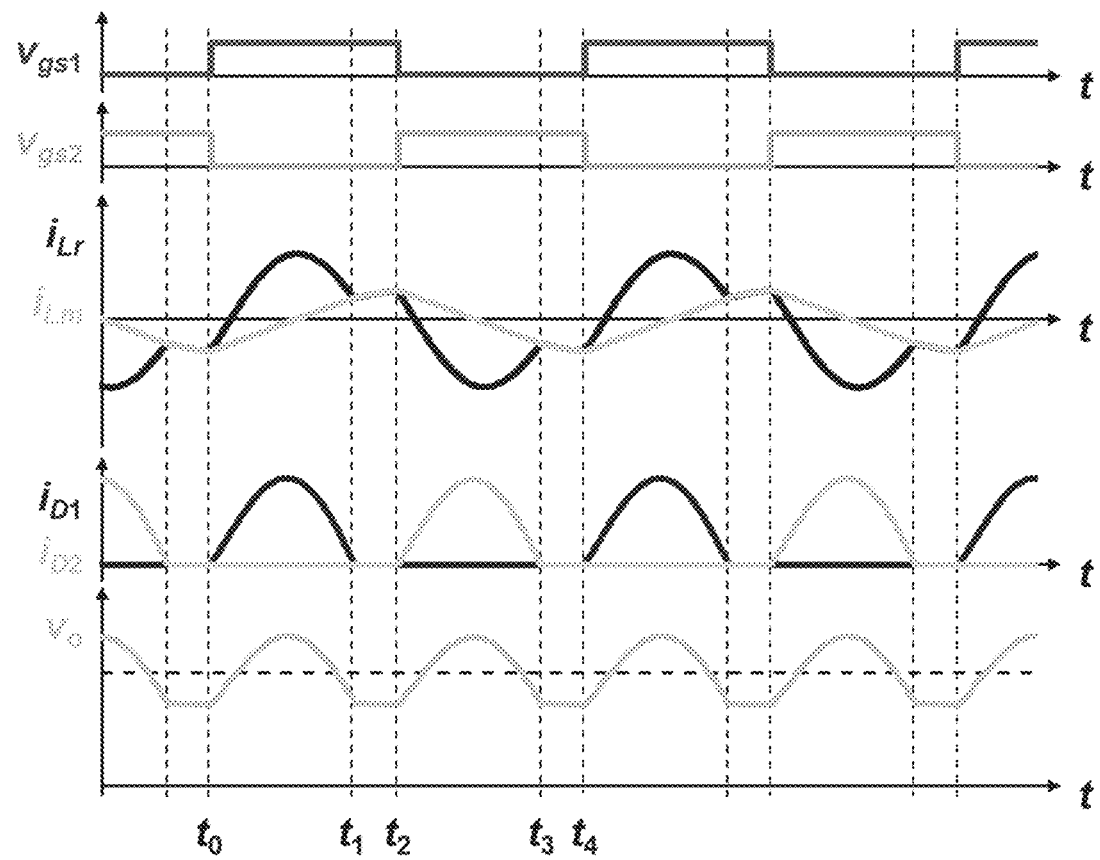
FIG. 5A illustrates the waveform diagram under magnetic-flux balance at region 1.

As shown in FIG. 5A, the waveform diagram under the magnetic-flux balance at region 1 is illustrated, the driven waveform $V_{gs1}$ of the primary-side first switch $Q_1$, the driven waveform $V_{gs2}$ of the primary-side second switch $Q_2$, the resonant inductor current $i_{Lr}$, the magnetizing inductor current $i_{Lm}$, and the current $i_{D1}$ of the secondary-side first diode, the current $i_{D2}$ of the secondary-side second diode, and the output voltage $V_o$ waveform of serial equivalent resistor of the output capacitor $C_o$ under steady-state balance of region 1 are shown sequentially.

Figure 5B:
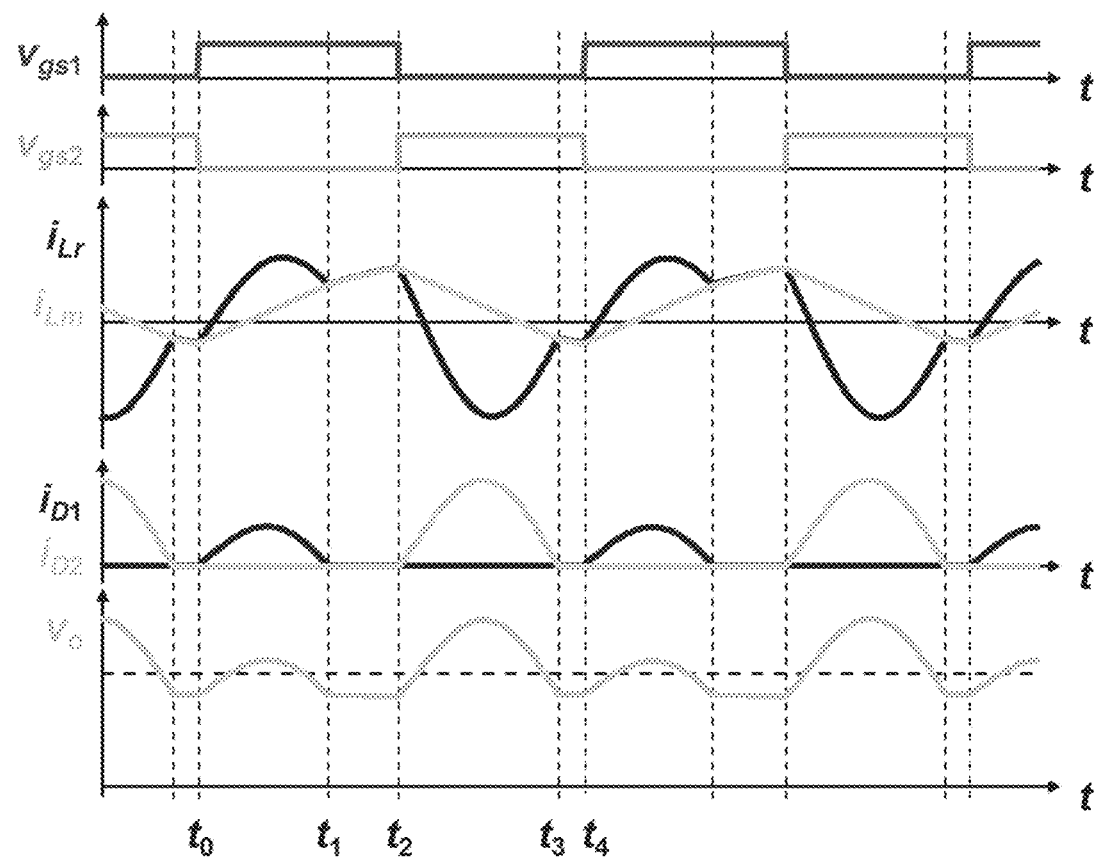
FIG. 5B illustrates the waveform diagram under magnetic-flux unbalance at region 1.

As shown in FIG. 5B, the waveform diagram under magnetic-flux unbalance at region 1 is illustrated. It shows the operation waveform at region 1 under steady-state unbalance. Its unbalance condition is the current $i_{D1}$ of the first diode is smaller than the current $i_{D2}$ of the second diode. After the current $i_{D1}$ of the first diode and the current $i_{D2}$ of the second diode are reflected to the primary-side winding $N_p$ through the transformer, which become the positive half cycle and the negative half cycle of the primary-side winding current $i_{Np}$, respectively (refer to the LLC resonant converter 302 illustrated in FIG. 3). Because the resonant inductor current $i_{Lr}$ is distributed to the transformer primary-side winding current $i_{Np}$ and the magnetizing inductor current $i_{Lm}$ simultaneously, and because the resonant inductor is connected to the resonant capacitor, the average value of the resonant inductor current $i_{Lr}$ can be maintained at zero ampere in accordance with the balance characteristics of the capacitor charge, that is the positive half cycle area equals to the negative half cycle area. However, because the positive half cycle and the negative half cycle of transformer primary-side winding current $i_{Np}$ do not equal, that is the positive half cycle area is smaller than the negative half cycle area ($i_{D1}<i_{D2}$), so that the negative average value is generated. According to the principle of shunting, the direct flow part of the transformer primary-side winding current will flow to the magnetizing inductor $L_m$, so that the magnetizing current $i_{Lm}$ will generate the positive average value ($i_{Lm,DC}$), which causes the transformer to generate the magnetic-flux shift phenomenon finally, and may cause the generation of saturation phenomenon under serious condition.

Figure 6A:
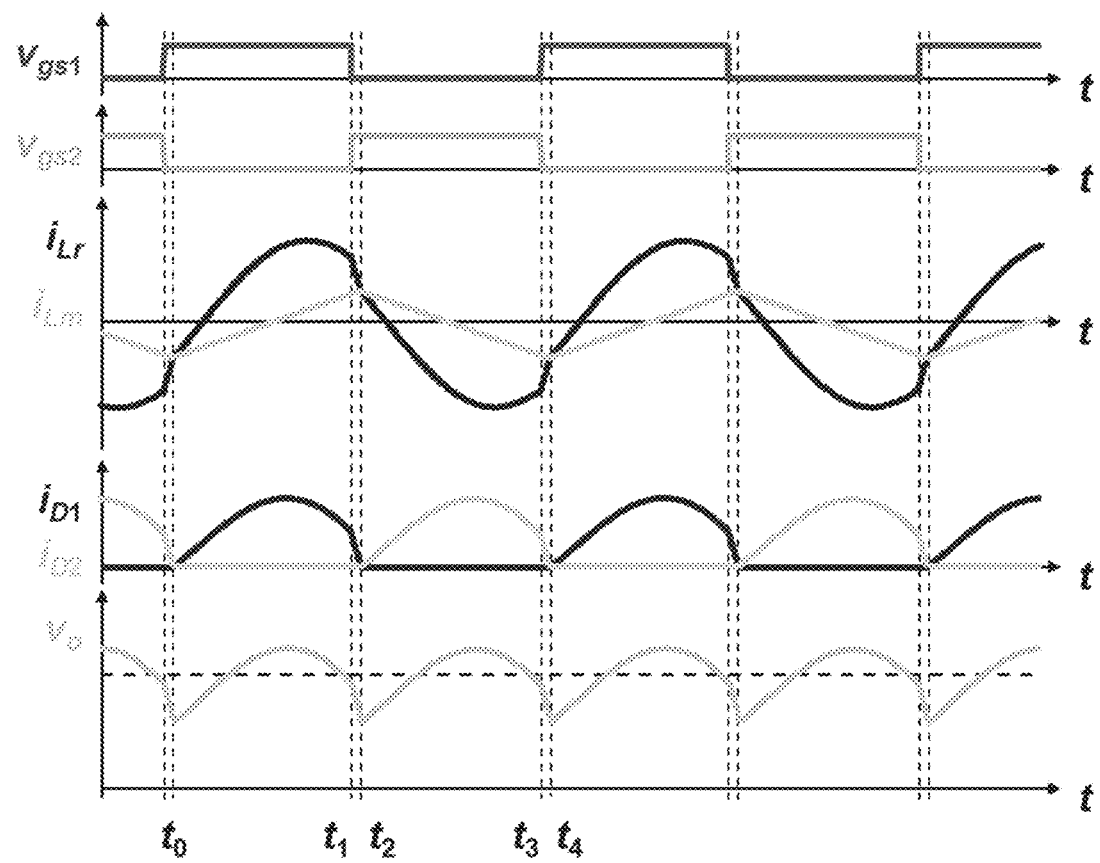
FIG. 6A illustrates the waveform diagram under magnetic-flux balance at region 2.
Figure 6B:
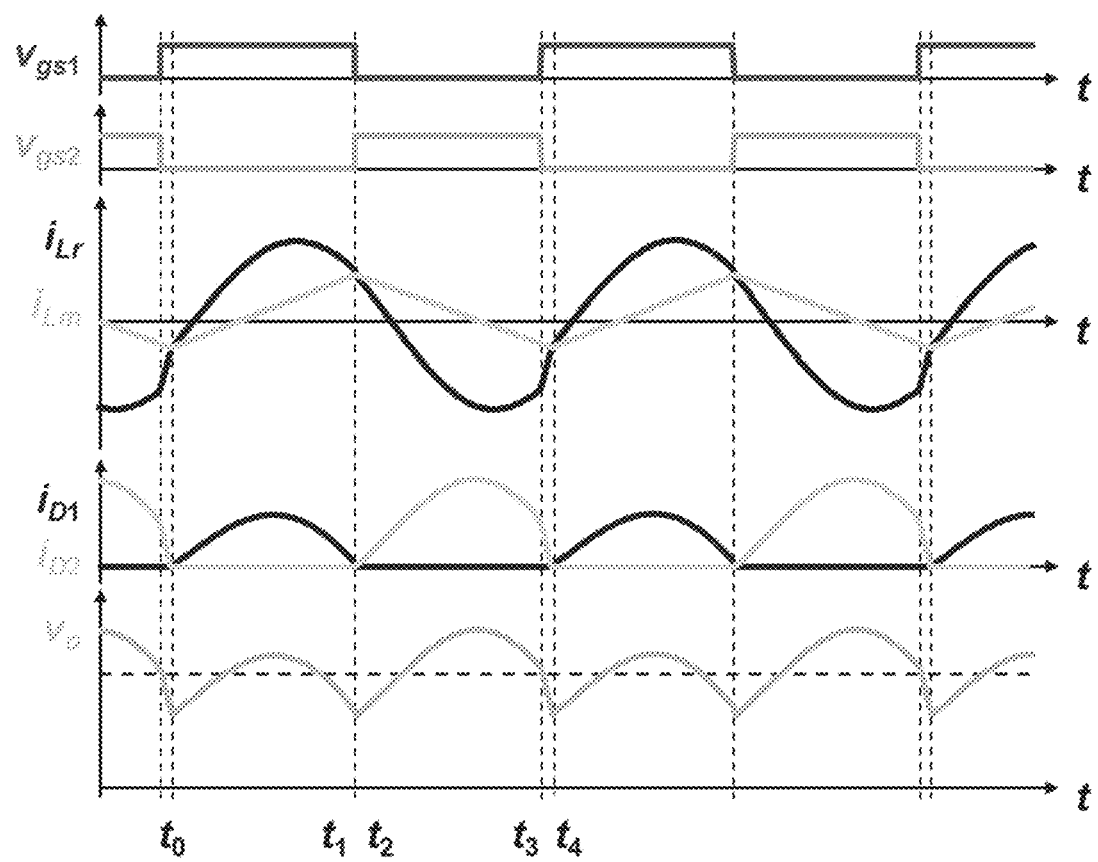
FIG. 6B illustrates the waveform diagram under magnetic-flux unbalance at region 2.

As shown in FIG. 6A, the waveform diagram under magnetic-flux balance at region 2 is illustrated. FIG. 6B illustrates the waveform diagram under magnetic-flux unbalance at region 2. As those shown in FIG. 5A and FIG. 5B, the driven waveform $V_{gs1}$ of the primary-side first switch $Q_1$, the driven waveform $V_{gs2}$ of the primary-side second switch $Q_2$, the resonant inductor current $i_{Lr}$, the magnetizing inductor current $i_{Lm}$, and the current $i_{D1}$ of the secondary-side first diode, the current $i_{D2}$ of the second diode, and the output voltage $V_o$ waveform of serial equivalent resistor of the output capacitor $C_o$ under steady-state balance of region 2 are shown sequentially. In FIG. 6B, when the unbalance is occurred, assume its unbalance condition is the current $i_{D1}$ of the first diode is smaller than the current $i_{D2}$ of the second diode. After the current $i_{D1}$ of the first diode and the current $i_{D2}$ of the second diode are reflected to the primary-side winding $N_p$ through the transformer, which become the positive half cycle and the negative half cycle of the primary-side winding current $i_{Np}$, respectively (refer to the LLC resonant converter 302 illustrated in FIG. 3). Because the resonant inductor current $i_{Lr}$ is distributed to the transformer primary-side winding current $i_{Np}$ and the magnetizing inductor current $i_{Lm}$ simultaneously, and because the resonant inductor is connected to the resonant capacitor, the average value of the resonant inductor current $i_{Lr}$ can be maintained at zero ampere in accordance with the balance characteristics of the capacitor charge, that is the positive half cycle area equals to the negative half cycle area. But because the positive half cycle and the negative half cycle of transformer primary-side winding current $i_{Np}$ do not equal, that is the positive half cycle area is smaller than the negative half cycle area ($i_{D1}<i_{D2}$), so the negative average value is generated. According to the principle of shunting, the direct flow part of the transformer primary-side winding current will flow to the magnetizing inductor $L_m$, so that the magnetizing current $i_{Lm}$ will generate the positive average value ($i_{Lm,DC}$), which causes the transformer to generate the magnetic-flux shift phenomenon finally, and may cause the generation of saturation phenomenon under serious condition.

Figure 7A:
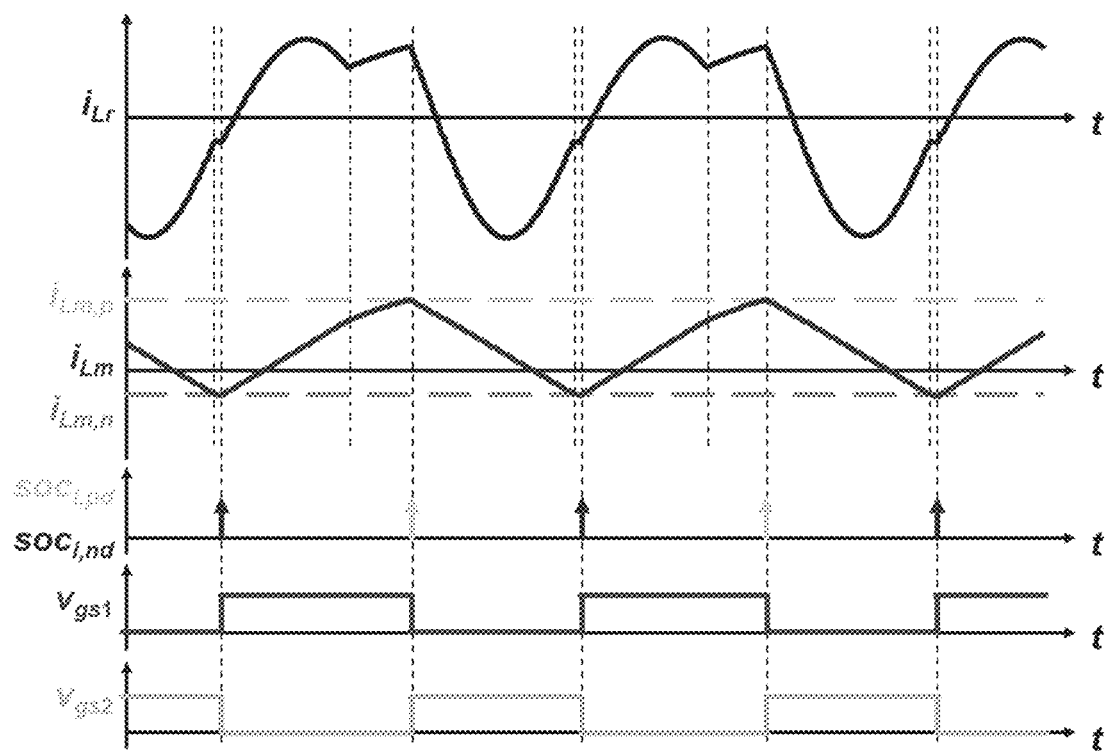
FIG. 7A illustrates the current waveform time sequence diagram at region 1.

As shown in FIG. 7A, the current waveform time sequence diagram at region 1 is illustrated. When LLC resonant converter 302 lies at the region 1 of voltage gain, input the gate source voltage $V_{gs1}$ of the first switch to the first switch $Q_1$. When the first switch $Q_1$ is conducted, the digital pulse-width-modulation generation unit 306 sends out a first pulse signal $SOC_{i,nd}$, to obtain a minimum value $i_{Lm,n}$ (that is minimum value of the negative half cycle) of the magnetizing inductor current.

Refer to FIG. 7A, the current waveform time sequence diagram at region 1 is illustrated. Upon inputting the gate source voltage $V_{gs2}$ of the second switch to the second switch $Q_2$, when the second switch $Q_2$ is conducted, the digital pulse-width-modulation generation unit 306 sends out a second pulse signal $SOC_{i,pd}$, to obtain a maximum value $i_{Lm,p}$ (that is maximum value of the positive half cycle) of the magnetizing inductor current.

As shown in FIG. 7A, in the current waveform time sequence diagram at region 1, the DC detection unit 308 adds the minimum value $i_{Lm,n}$ of the magnetizing inductor current and the maximum value $i_{Lm,p}$ of the magnetizing inductor current, in order to obtain an average current value $i_{Lm,DC}$ of the magnetizing inductor. It is necessary to address that after the average current value $i_{Lm,DC}$ of the inductor described in this embodiment is controlled, it will become zero ampere.

Figure 7B:
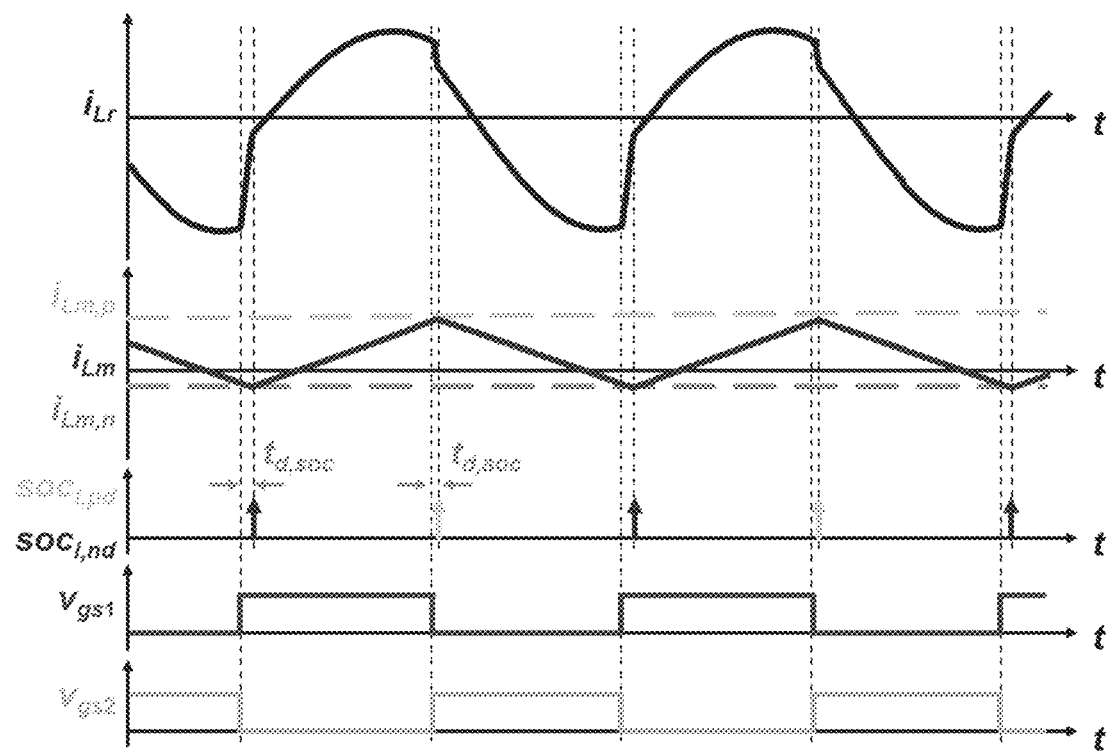
FIG. 7B illustrates the current waveform time sequence diagram at region 2.

As shown in FIG. 7B, the current waveform time sequence diagram at region 2 is illustrated. When LLC resonant converter 302 lies at the region 2 of voltage gain, and the first switch $Q_1$ is conducted, the digital pulse-width-modulation generation unit 306 will delay to send out the first pulse signal $SOC_{i,nd}$ at $t_{d,soc}$ of delay time, to obtain a minimum value $i_{Lm,n}$ of the magnetizing inductor current. When the second switch $Q_2$ is conducted, the digital pulse-width-modulation generation unit 306 will delay to send out the second pulse signal $SOC_{i,pd}$ at $t_{d,soc}$ of delay time, to obtain a maximum value $i_{Lm,p}$ of the magnetizing inductor current.

As shown in FIG. 7B, in the current waveform time sequence diagram at region 2, the DC detection unit 308 adds the minimum value $i_{Lm,n}$ of the magnetizing inductor current and the maximum value $i_{Lm,p}$ of the magnetizing inductor current, in order to obtain an average current value $i_{Lm,DC}$ of the magnetizing inductor. It is necessary to address that after the average current value $i_{Lm,DC}$ of the inductor described in this embodiment is controlled, it will become zero ampere.

Figure 1:
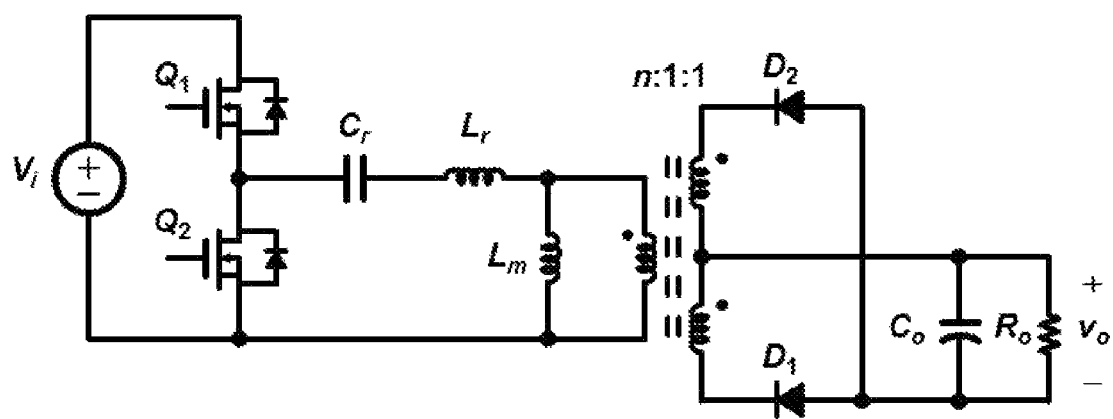
FIG. 1 illustrates the conventional half-bridge LLC resonant converter.
Figure 2A:
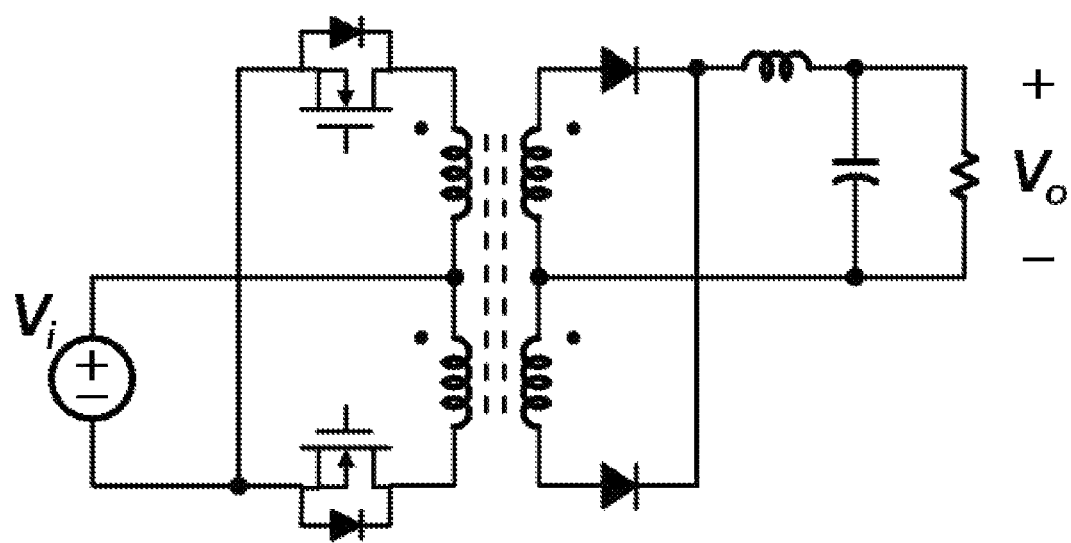
FIG. 2A illustrates the conventional push pull converter.
Figure 2B:
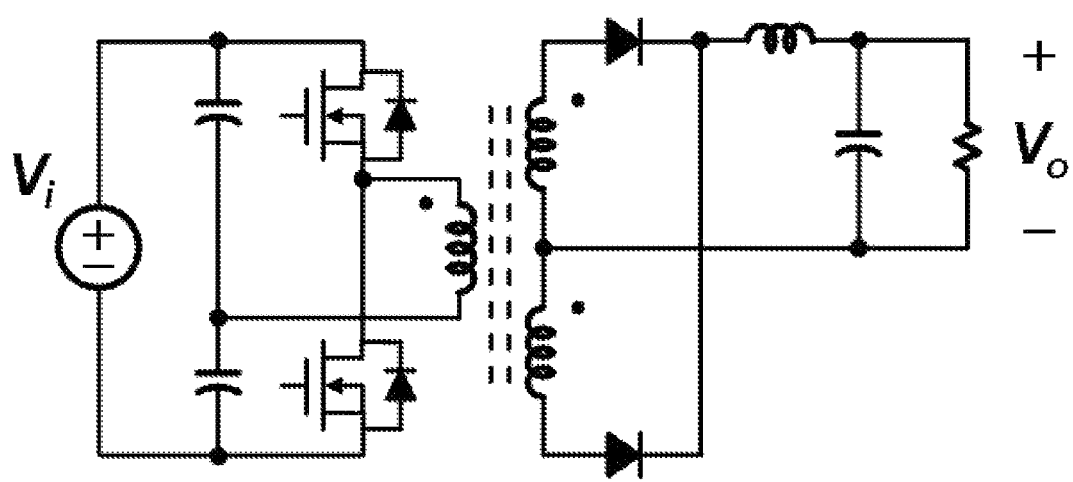
FIG. 2B illustrates the conventional half-bridge converter.
Figure 2C:
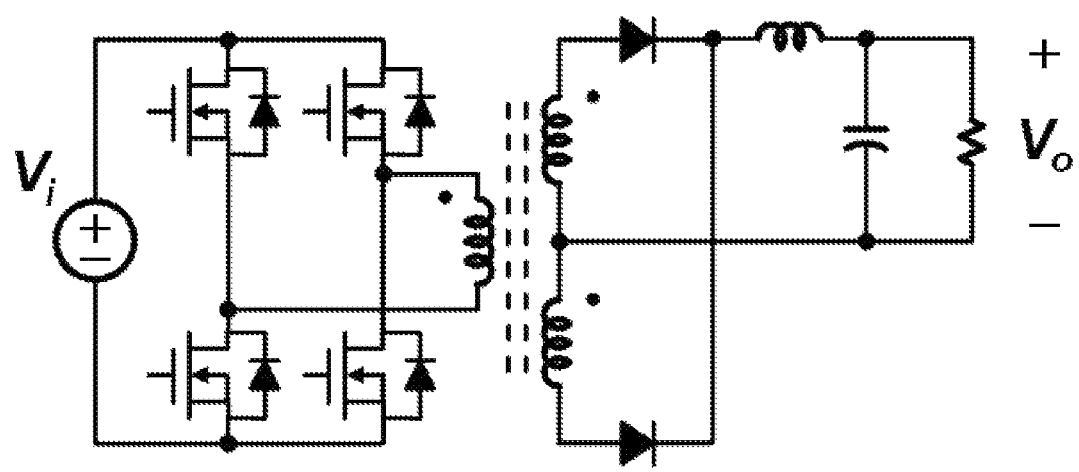
FIG. 2C illustrates the conventional full-bridge converter.
Figure 8A:
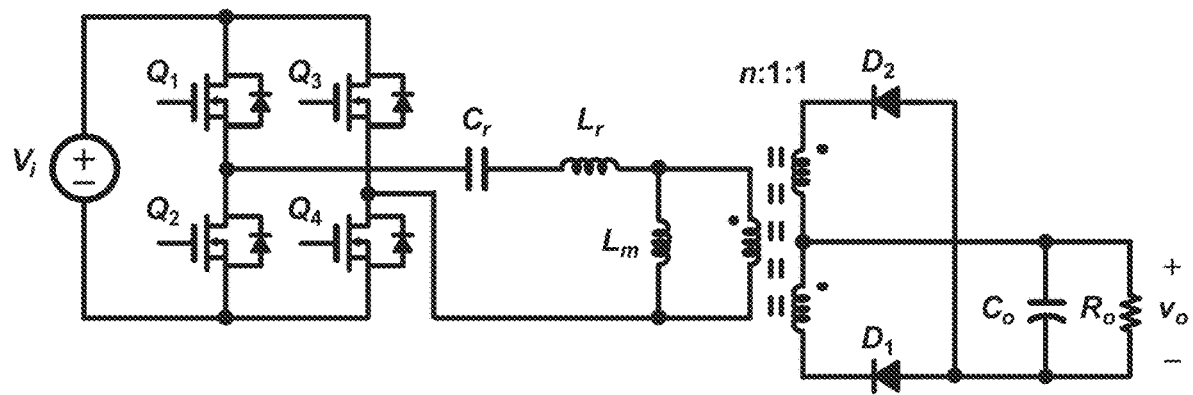
FIG. 8A illustrates the full-bridge LLC resonant converter.
Figure 8B:
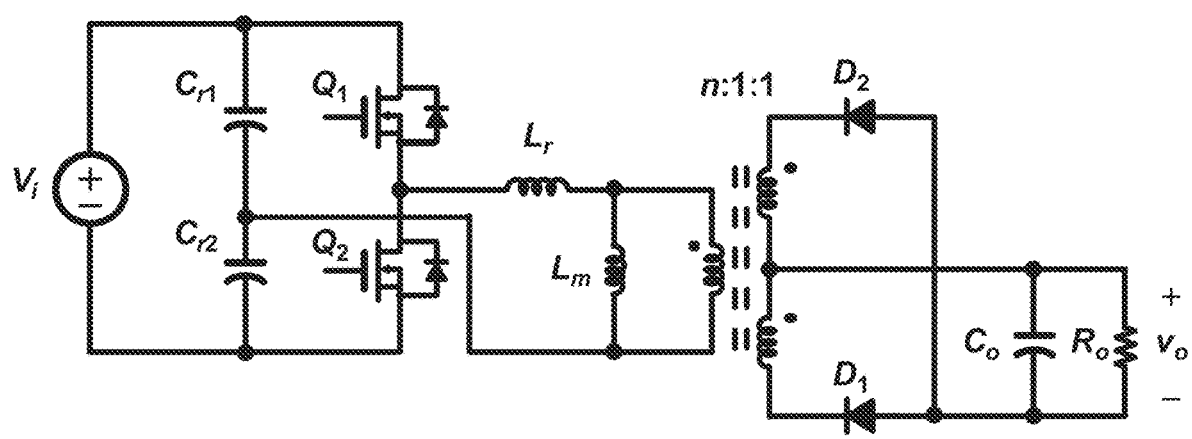
FIG. 8B illustrates half-bridge LLC resonant converter with the split capacitor at the input end.

In addition, the abovementioned embodiment of the present invention except can be applied to the half-bridge LLC resonant converter shown in FIG. 1, it can also be applied to the full-bridge LLC resonant converter shown in FIG. 8A, and the half-bridge LLC resonant converter with the split capacitor at the input end shown in FIG. 8B, and furthermore can be applied to the LLC resonant converters with other different structures.

The embodiment disclosed in the present invention provides a LLC resonant converter with magnetic-flux control circuit. The LLC resonant converter has the control and estimate mechanism for the transformer magnetic-flux balance. Through lesser sensing elements, cooperate with the estimate method provided by the present invention to detect the DC level of the magnetic-flux and control method, adjust the conduction time of switch, further to improve the magnetic-flux balance effect.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A LLC resonant converter with magnetic-flux control circuit, comprising:
    a LLC resonant converter, which includes a primary-side circuit and a secondary-side circuit, wherein the primary-side circuit including a primary-side winding, a resonant inductor, a resonant capacitor, a first switch and a second switch, the secondary-side circuit includes a secondary-side winding, a first diode, a second diode, an output capacitor and an output resistor, the secondary-side winding includes a first secondary-side winding and a second secondary-side winding;
    a voltage control unit, which being connecting to the secondary-side circuit, the voltage control unit, which being receiving the output voltage, and outputting a control voltage;
    a digital pulse-width-modulation generation unit, which being connecting to the voltage control unit, the voltage control unit sends the control voltage to the digital pulse-width-modulation generation unit for adjusting and controlling the switching period of the first switch and the second switch;
    a DC detection unit, which is connecting the primary-side circuit, the DC detection unit detecting the sensed resonant inductor current signal of the primary-side circuit in accordance with the pulse signal generated by the digital pulse-width-modulation generation unit, and calculating the magnetizing inductor average current of a transformer in accordance with the sensed resonant inductor current signal; and
    a balance control unit, which being connecting to the DC detection unit, wherein, the balance control unit achieving to adjust the transformer magnetizing inductor average current to zero ampere, through adjusting the first switch duty-cycle ratio of the first switch and the second switch duty-cycle ratio of the second switch.

2. The LLC resonant converter with magnetic-flux control circuit according to claim 1, wherein, the LLC resonant converter includes a DC power source, a first switch, a second switch, a resonant inductor, a resonant capacitor, a magnetizing inductor, a first diode, a second diode, an output capacitor, an output resistor and an ideal center-tapped transformer;
    wherein, the first switch, the second switch, the resonant inductor, the resonant capacitor, the magnetizing inductor, and the output resistor having a first end and a second end, respectively;
    wherein, the DC power source, the first diode, the second diode, and the output capacitor having a positive end and a negative end, respectively;
    wherein, the secondary-side winding including a first secondary-side winding and a second secondary-side winding; the primary-side winding, the first secondary-side winding and the second secondary-side winding have a positive end and a negative end, respectively;

wherein, the positive end of the DC power source connecting to the first end of the first switch, and the negative end of the DC power source connects to the second end of the second switch;

wherein, the second end of the first switch and the first end of the second switch, and the first end of the resonant capacitor being all connected together;

wherein, the second end of the resonant capacitor connecting to the first end of the resonant inductor;

wherein, the second end of the resonant inductor connecting to the first end of the magnetizing inductor and the positive end of the primary-side winding;

wherein, the second end of the magnetizing inductor and the negative end of the primary-side winding, and the second end of the second switch being all connected together;

wherein, the positive end of the first secondary-side winding and the negative end of the second secondary-side winding, the positive end of the output capacitor, and the first end of the output resistor being all connected together;

wherein, the negative end of the first secondary-side winding connecting the negative end of the first diode;

wherein, the positive end of the second secondary-side winding connecting the negative end of the second diode; and wherein, the positive end of the first diode and the positive end of the second diode, the negative end of the output capacitor, and the second end of the output resistor being all connected together.

3. The LLC resonant converter with magnetic-flux control circuit according to claim 1, wherein, the control unit includes a voltage control unit, a balance control unit, a DC detection unit, and a digital pulse-width-modulation generation unit;

wherein, the voltage control unit and balance control unit having an input end and an output end, respectively;

wherein, the DC detection unit having a first input end, second input end, third input end and one output end;

wherein, the digital pulse-width-modulation generation unit having a first input end, a second input end, a first output end, a second output end, a third output end, and a fourth output end;

wherein, the first input end of digital pulse-width-modulation generation unit connecting to the output end of the voltage control unit;

wherein, the input end of the voltage control unit connecting to the positive end of the output capacitor in the secondary-side circuit of the LLC resonant converter;

wherein, the second input end of the digital pulse-width-modulation generation unit connecting to the output end of the balance control unit;

wherein, the input end of the balance control unit connecting to the output end of the DC detection unit;

wherein, the first output end and second output end of the digital pulse-width-modulation generation unit being the driven signal of the first switch and the second switch, respectively;

wherein, the third output end of the digital pulse-width-modulation generation unit being the first pulse signal, which being also the second input end of the DC detection unit;

wherein, the fourth output end of the digital pulse-width-modulation generation unit being the second pulse signal, which being also the third inputting end of the DC detection unit; and wherein, the first input end of the DC detection unit being the signal of the sensed resonant inductor current.

4. The LLC resonant converter with magnetic-flux control circuit according to claim 3, wherein, when the LLC resonant converter lying at the region 1 of voltage gain, and when the first switch being conducted, the digital pulse-width-modulation generation unit sending out a first pulse signal without the delay time, in order to obtain a minimum value of the magnetizing inductor current; wherein, when the second switch being conducted, the digital pulse-width-modulation generation unit sending out a second pulse signal without the delay time, in order to obtain a maximum value of the magnetizing inductor current.

5. The LLC resonant converter with magnetic-flux control circuit according to claim 4, wherein, when the LLC resonant converter lying at region 2 of the voltage gain, and when the first switch being conducted, the digital pulse-width-modulation generation unit sending out a first pulse signal with the delay time, in order to obtain a minimum value of the magnetizing inductor current; wherein, when the second switch being conducted, the digital pulse-width-modulation generation unit sending out a second pulse signal with the delay time, in order to obtain a maximum value of the magnetizing inductor current.

6. The LLC resonant converter with magnetic-flux control circuit according to claim 4, wherein, the DC detection unit adding the minimum value of the magnetizing inductor current and the maximum value of the magnetizing inductor current to obtain the average current value, and after adjusted by the balance control unit, the average current value being zero ampere.

7. The LLC resonant converter with magnetic-flux control circuit according to claim 6, wherein, when LLC resonant converter lying at the region 1 of the voltage gain, the digital pulse-width-modulation generation unit sending out a first pulse signal without the delay time, and a second pulse signal without the delay time.

8. The LLC resonant converter with magnetic-flux control circuit according to claim 6, wherein, when LLC resonant converter lying at region 2 of the voltage gain, the digital pulse-width-modulation generation unit sending out a first pulse signal with the delay time, and a second pulse signal with the delay time.

9. The LLC resonant converter with magnetic-flux control circuit according to claim 1, wherein, the sum of the first switch duty-cycle ratio and the second switch duty-cycle ratio is 100%.

10. The LLC resonant converter with magnetic-flux control circuit according to claim 9, wherein, under the balance condition of the LLC resonant converter circuit, wherein the first switch duty-cycle ratio being 50%, and the second switch duty-cycle ratio being also 50%.

* * * * *